United States Patent
Gormley

(10) Patent No.: US 9,617,871 B2
(45) Date of Patent: Apr. 11, 2017

(54) AFT CASCADE TRANSLATING VARIABLE AREA FAN NOZZLE

(71) Applicant: Rohr, Inc., Chula Vista, CA (US)

(72) Inventor: Timothy Gormley, Bonita, CA (US)

(73) Assignee: Rohr, Inc., Chula Vista, CA (US)

(*) Notice: Subject to any disclaimer, the term of this patent is extended or adjusted under 35 U.S.C. 154(b) by 763 days.

(21) Appl. No.: 13/949,986

(22) Filed: Jul. 24, 2013

(65) Prior Publication Data

US 2014/0030057 A1 Jan. 30, 2014

Related U.S. Application Data

(60) Provisional application No. 61/675,289, filed on Jul. 24, 2012.

(51) Int. Cl.
| | |
|---|---|
| *F01D 9/02* | (2006.01) |
| *F01D 25/24* | (2006.01) |
| *F01D 17/14* | (2006.01) |
| *F02K 1/09* | (2006.01) |
| *B64D 33/04* | (2006.01) |
| *F02K 1/42* | (2006.01) |
| *B64D 29/00* | (2006.01) |

(52) U.S. Cl.
CPC ............. *F01D 25/24* (2013.01); *B64D 33/04* (2013.01); *F01D 9/02* (2013.01); *F01D 17/143* (2013.01); *F02K 1/09* (2013.01); *F02K 1/42* (2013.01); *B64D 29/00* (2013.01)

(58) Field of Classification Search
CPC .......... F01D 25/24; F01D 9/02; F01D 17/143; B64D 33/04; F02K 1/06; F02K 1/08; F02K 1/09; F02K 1/42
See application file for complete search history.

(56) References Cited

U.S. PATENT DOCUMENTS

| | | | | |
|---|---|---|---|---|
| 5,778,659 A | * | 7/1998 | Duesler | F02K 1/09 239/265.27 |
| 8,006,479 B2 | * | 8/2011 | Stern | F02K 1/09 60/226.2 |
| 8,104,261 B2 | * | 1/2012 | Marshall | F02K 1/09 239/265.19 |
| 8,505,307 B2 | * | 8/2013 | Wang | F02K 1/09 239/265.25 |
| 9,255,546 B2 | * | 2/2016 | Welch | F02K 1/09 |
| 2009/0288386 A1 | * | 11/2009 | Marshall | F02K 1/09 60/204 |

* cited by examiner

*Primary Examiner* — Ninh H Nguyen
(74) *Attorney, Agent, or Firm* — O'Shea Getz P.C.

(57) ABSTRACT

An aircraft turbofan engine variable area fan nozzle (VAFN) is disclosed that has a forward end that is continuously supported within a circumferential recess in the wall of the nacelle in front of it. During operation, the VAFN translates back and forth but always has its front end within the recess. Relatively simple seals help seal the recess against the VAFN. An array of openings with aft facing vanes, termed an aft cascade, is built into the VAFN. The openings are hidden within the recess when the VAFN is in the forward-most positions, and they are exposed to allow air to flow from the bypass duct through the cascade when the VAFN is in aft positions. The aft cascades can have different airflow directions based on their locations around the engine.

20 Claims, 6 Drawing Sheets

AFT CASCADE TRANSLATING VARIABLE AREA FAN NOZZLE

This applications claims priority to U.S. patent application. No. 61/675,289 filed Jul. 24, 2012.

BACKGROUND

1. Field of the Invention

This disclosure is generally related to nacelles for aircraft turbofan engines and, more particularly, to nacelles having variable-area fan nozzle (VAFN) assemblies with circumferential cascade ports for fan bypass air.

2. Description of the Related Art

Modern aircraft employ turbofan variants of gas turbine engines that have a low fan pressure ratio (FPR) and high bypass ratio (BPR) for a bypass duct of the engine. As turbofan engine technology has matured, designers have stretched the associated technologies to minimize weight, cost, and maintenance while maximizing efficiency. Because of the extreme limits to which these engines are designed, and the valuable commercial interest in having the most efficient product available, even incremental improvements are sought after in the design of commercial turbofan engines.

Turbofan engines are often optimized for cruise at around 30,000 feet above mean sea level (MSL), an altitude at which many commercial airplanes spend much of their time. Engine geometries that are best suited for cruise at altitude are not necessarily the best geometries suited for other realms of flight, including the different realms of take-off and landing. Environmental parameters such as ambient air pressure, temperature, humidity, kinematic viscosity, Mach speed, and other atmospheric conditions are different as between operation for landing and operation at altitude. Engine power, flow velocity, and Reynolds numbers are different among the operational regimes of take-off, cruise, and landing. Great efforts have been expended to produce aircraft engines that can alter their geometries for different flight regimes.

A variable area fan nozzle (VAFN) assembly allows a turbofan engine to alter its fan bypass duct geometry. Specifically, a VAFN assembly effectively has an exit passage or throat area where fan bypass air exits the engine, and that is constricted or opened, usually by slight amounts. Typically, adjusting the exit passage area is accomplished by axially moving an aft airfoil end of a VAFN assembly forward or aft in relation to an inner fixed structure (IFS) at the exit end of the engine. As the VAFN aft airfoil is moved aft, more cross-section of the exit passage area becomes available for airflow to exit the engine. Slight amounts of VAFN assembly movement in the axial direction, as little as mere inches of movement, can be quite effective in adjusting the airflow out the engine.

During takeoff and landing, the VAFN assembly is typically moved to increase the exit area for bypass airflow. At cruise operation, the VAFN assembly is typically moved to decrease the exit area for bypass airflow. In different regions of flight and power settings, a VAFN assembly may have different positions or alternate scheduling as compared with takeoff and landing.

There is a need in the art for reliable devices to alter engine geometries, including improvements to VAFN designs.

SUMMARY

A turbofan engine nacelle having a variable area fan nozzle (VAFN) assembly is described in which a front edge of the VAFN assembly is continuously supported within a circumferential slot in the nacelle wall while the VAFN assembly translates forward and aft. The front edge of the VAFN assembly can maintain a constant seal with the nacelle wall while sliding back and forth within the circumferential slot during translation.

Instead of a solid shell, the VAFN assembly can include rows of holes so that when the VAFN assembly translates aft far enough, the holes are exposed from the slot, and airflow from the fan bypass duct can exit the holes. The holes can be vaned in a grid-like cascade fashion, the vanes directing the bypass air aft. The vanes can be directed all in the same direction or in different directions, and the openings between the vanes can be all the same size or of different sizes depending on their locations around the nacelle.

Controls can stop the VAFN assembly movement as each entire, integer row of openings between the vanes is exposed. The sizes of the openings and vane directions at each row can be tailored for different flight regimes that correspond to altitudes where an airplane powered by the engine would spend large portions of its flight profile.

Some embodiments are related to a nacelle assembly apparatus for a turbofan engine. The apparatus includes a nacelle wall defining a bypass duct that extends at least partially around a centerline of a turbofan engine, the bypass duct being configured to transport bypass airflow of the engine, the nacelle wall having an aft end recess within a thickness of the nacelle wall. The nacelle apparatus also includes an arcuate variable area fan nozzle (VAFN) assembly section having a front region, a center region, and a trailing edge, the VAFN assembly section being movable between (a) a fully forward position and (b) a fully aft position. The front region of the VAFN assembly section has an edge configured to bear against and be at least partially supported within a recess of the nacelle wall at all positions between and including the fully forward and fully aft positions. That is, at least a portion of the VAFN assembly front region is supported within a recess of the nacelle wall at all positions.

The nacelle assembly apparatus can be configured to bear against and be at least partially supported by an internal lip of the recess. The nacelle assembly apparatus can include one or more apertures through a portion of the VAFN assembly section, wherein each aperture is covered by the nacelle wall recess when the VAFN assembly section is in the fully forward position, and each aperture is exposed when the VAFN assembly section is in the fully aft position, such that when the VAFN assembly section is in the fully aft position and each aperture is exposed, bypass airflow can exit each aperture. Furthermore, at least one vane can be disposed within at least one aperture and can divide the aperture into rows of openings, the at least one vane being configured to direct bypass airflow in an aft direction.

Some embodiments relate to a nacelle assembly apparatus for a turbofan engine. The nacelle assembly apparatus includes a nacelle wall defining a bypass duct that extends at least partially around a centerline of a turbofan engine, the bypass duct being configured to transport bypass airflow of the engine, the nacelle wall having an aft end recess within a thickness of the nacelle wall, an arcuate variable area fan nozzle (VAFN) section having a front region, a center region, and a trailing edge, the VAFN section being movable between (a) a fully forward position and (b) a fully aft position, the front region of the VAFN section configured to stay within the recess of the nacelle wall at all positions between and including the fully forward and fully aft positions, the center region having a cascade of vanes defining multiple rows of openings, the vanes configured to direct bypass airflow in an aft direction, and an actuator configured to move the VAFN section between the fully forward and fully aft positions, the actuator configured to temporarily stop or halt movement of the VAFN section after openings are exposed or covered. The actuator can have predetermined settings configured to temporarily stop or halt movement of the VAFN section after each row of openings is exposed or covered.

Some embodiments relate to a method of adjusting a fan bypass exit area of a turbofan engine having a variable area fan nozzle (VAFN) assembly. The method includes translating an arcuate VAFN assembly section with respect to an inner fixed structure of the turbofan engine, the VAFN assembly section having a front region, a center region, and a trailing edge, wherein the translating movement causes a radial distance between the trailing edge and the inner fixed structure to change a fan bypass exit area of the engine. Translating the VAFN assembly section aft exposes at least a first row of openings through the center region, thereby allowing bypass airflow to exit through the openings as well as exit between the trailing edge and the inner fixed structure. Translating the VAFN assembly section forward covers the openings. During each of the respective translating movements to expose and cover the openings, the front region of the VAFN assembly section bears against and is at least partially supported within the recess of the nacelle wall. That is, at least a portion of the VAFN assembly front region is supported within the recess of the nacelle wall at all positions.

The method can further include translating the VAFN section further aft to expose an additional row or rows of openings through the center region such that the first and the additional row(s) of openings are exposed, the front region still bearing against and at least partially supported within the recess of the nacelle wall, and translating forward the VAFN section to cover the openings, wherein the front region of the VAFN assembly section bears against and is at least partially supported within the recess of the nacelle wall during the translating movements to expose and cover the openings. The translating movements can be automatically stopped at any axial location and between any of the sets of rows of openings.

Other features and advantages of the present invention should be apparent from the following description of the preferred embodiments, which illustrate, by way of example, the principles of the invention.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the invention.

DETAILED DESCRIPTION

In the following description, various embodiments will be described. For purposes of explanation, specific configurations and details are set forth in order to provide a thorough understanding of the embodiments. It will also be apparent to one skilled in the art that the present invention can be practiced without the specific details described herein. Furthermore, well-known features may be omitted or simplified in order not to obscure the embodiment being described.

A VAFN assembly having a front section with a circumferential edge that is continuously supported around the circumference of the nacelle can be stronger and stiffer than a VAFN assembly that is supported only by discrete discontinuous tracks and actuators. By locating the front section within a recess of the nacelle wall, the top and bottom surfaces of the front end can remain flush against seals while sliding back and forth against them. The seals can then be designed to be simpler than a construction in which the front end of the VAFN assembly breaks contact with the nacelle wall (that is, where the VAFN assembly is not continuously supported). For example, icing problems are less of an operational issue because the sliding architecture provides fewer open areas in which ice may accumulate. Furthermore, there are no forward facing steps that experience high dynamic pressure or are subject to icing.

A VAFN assembly with a grid of airflow openings offers design opportunities to rapidly open or increase the bypass exit area for relatively small translation movements of the VAFN assembly. Typically, a VAFN assembly is translated forward and aft in parallel with the centerline of the engine to vary the distance between the VAFN assembly trailing edge and an inner fixed structure that generally curves inward or outward. The slope of the inner fixed structure should not be sufficiently large to impede the flow of air. Airflow holes in the VAFN assembly allow exit area to be rapidly increased without sloping the inner fixed structure such that the flow of air is impeded. These airflow openings or holes, defined by vanes of a cascade, can be tuned for control of efflux and noise. For example, for an engine supported from an aircraft wing, vanes near the bottom of the engine can direct airflow more aft in order to minimize collecting debris that might be blown in from a runway or landing strip. Meanwhile, vanes near the top of the engine can direct airflow more radially outward to externally direct airflow away from the bottom of the wing.

A grid of vane openings in the VAFN assembly can resemble a lattice, fin-like vaned openings on a cascade-type thrust reverser. However, the vanes within the VAFN assembly openings direct airflow aft, while a cascade-type thrust reverser generally directs airflow forward. Thus, an embodiment can sometimes can be referred to as having "aft cascades."

Figure 1:
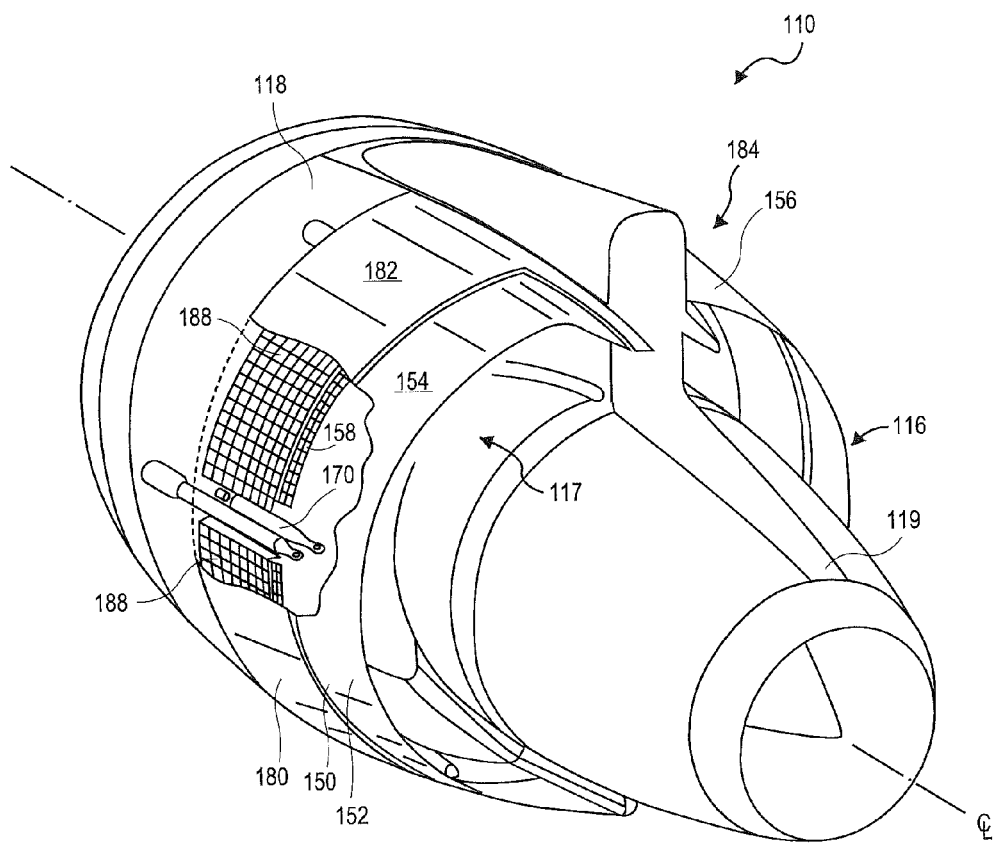
FIG. 1 illustrates a perspective view from the rear quarter of an aircraft engine with a VAFN fully forward in accordance with an embodiment.

FIG. 1 illustrates an aircraft engine 110 with an associated nacelle assembly 118 that includes a thrust reverser 180, which moves between a stowed position and a deployed position. In FIG. 1, the thrust reverser 180 is shown in the stowed position. The engine 110 includes an engine core 116 housed in a core cowl 119.

The thrust reverser 180 includes an arcuate first sleeve or first cowl section 182 on one side of the nacelle (the left-side of the FIG. 1 drawing) and a corresponding arcuate second sleeve or second cowl section 184 on the other side of the nacelle (the right-side of the FIG. 1 drawing). Peripherally-spaced thrust reverser sleeve actuators are mounted on or in the nacelle 118 and are shown in the drawing as connecting with the first and second thrust reverser sleeves 182 and 184. The first and second thrust reverser sleeve sections 182 and 184 are axially translatable in the axial direction (i.e., parallel to the engine centerline) by the sleeve actuators. When deployed, the translated sleeves expose cascade vanes 188 of the thrust reverser 180.

The thrust reverser assembly 180 includes a variable area fan nozzle (VAFN) assembly 150 that is mounted on the aft end of the thrust reverser assembly. The VAFN assembly 150 includes a translating fan nozzle 152 having arcuate ring sections or airfoils 154, 156. In the illustrated embodiment, the two VAFN ring sections are shown with one on the left side 154 of the nacelle and the other on the right side 156, corresponding to the left sleeve 182 and left sleeve 184, respectively. The VAFN ring sections 154, 156 are each axially translatable with respect to the centerline of the engine 110. In operation, the ring actuators 170 move the VAFN ring sections 154, 156 fore and aft relative to the engine, varying the exit area of the bypass duct 117. As will be apparent to those skilled in the art, the nacelle assembly 118 can have more than two VAFN ring sections and may have other arrangements for moving the ring sections relative to the engine 110.

Cascade vane openings 158 are located in the arcuate ring sections 154, 156 of the VAFN assembly 150, and are hidden within the thrust reverser cowl section 182 of the nacelle assembly 118 shown in FIG. 1. In the FIG. 1 fully stowed and forward position of the VAFN section 154, the VAFN section 154 forms a substantially continuous outer surface extending from the outer surface of the thrust reverser sleeve section 182 to the outer surface of the VAFN section. Similarly, the VAFN section 156 forms a substantially continuous surface extending from the outer surface of the thrust reverser sleeve section 184 to the outer surface of the VAFN section. The surfaces within the bypass duct are continuous as well. The cascade vane openings 158 in the VAFN sections 154, 156 are located within a slot of their respective thrust reverser sleeves 182, 184 of the nacelle assembly 118.

Figure 2:
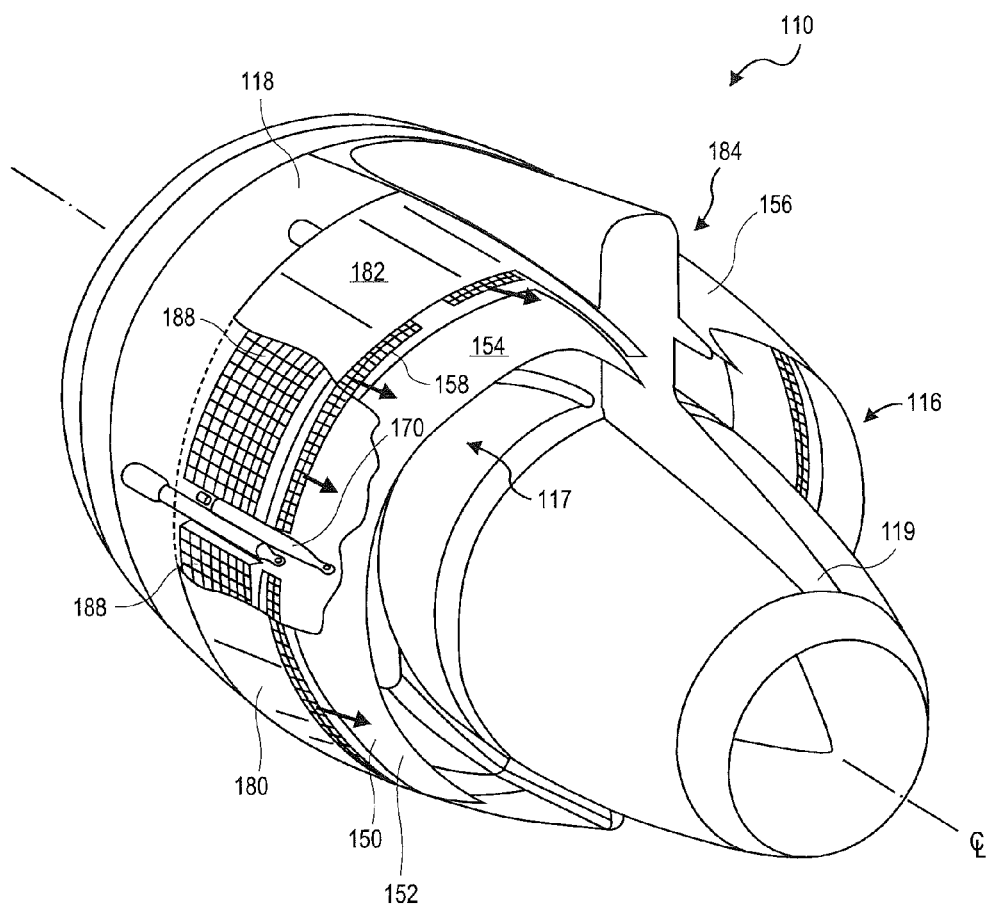
FIG. 2 illustrates the aircraft engine of FIG. 1 with a VAFN fully aft.

FIG. 2 illustrates the aircraft engine 110 of FIG. 1 with the VAFN sections 154, 156 in a fully aft position. The VAFN sections 154 and 156 are shown translated aft from the position shown in FIG. 1. At a location between the stowed position and the fully aft (deployed) position of FIG. 2, at least one row of the cascade vane openings 158 becomes exposed. That is, the row of vane openings becomes exposed both to the outside of the engine 110 as well as to the inside of the bypass duct 117. At another location, which is depicted in FIG. 2, two or more rows of the cascade vane openings 158 are exposed. Multiple columns of openings are in each row.

Upon becoming exposed, each row of the cascade vane openings 158 allows air to flow from the fan bypass duct 117 to the outside of the engine 110. This immediately increases the effective exit area for the bypass air and affects back pressure into the engine. Although some of the rearward velocity of the fan bypass air is slowed by slipping into the cascaded vaned openings and exiting axially and/or radially out the sides of the engine, the benefits associated with being able to increase the exit area rapidly can offset any operational deficits.

Figure 3:
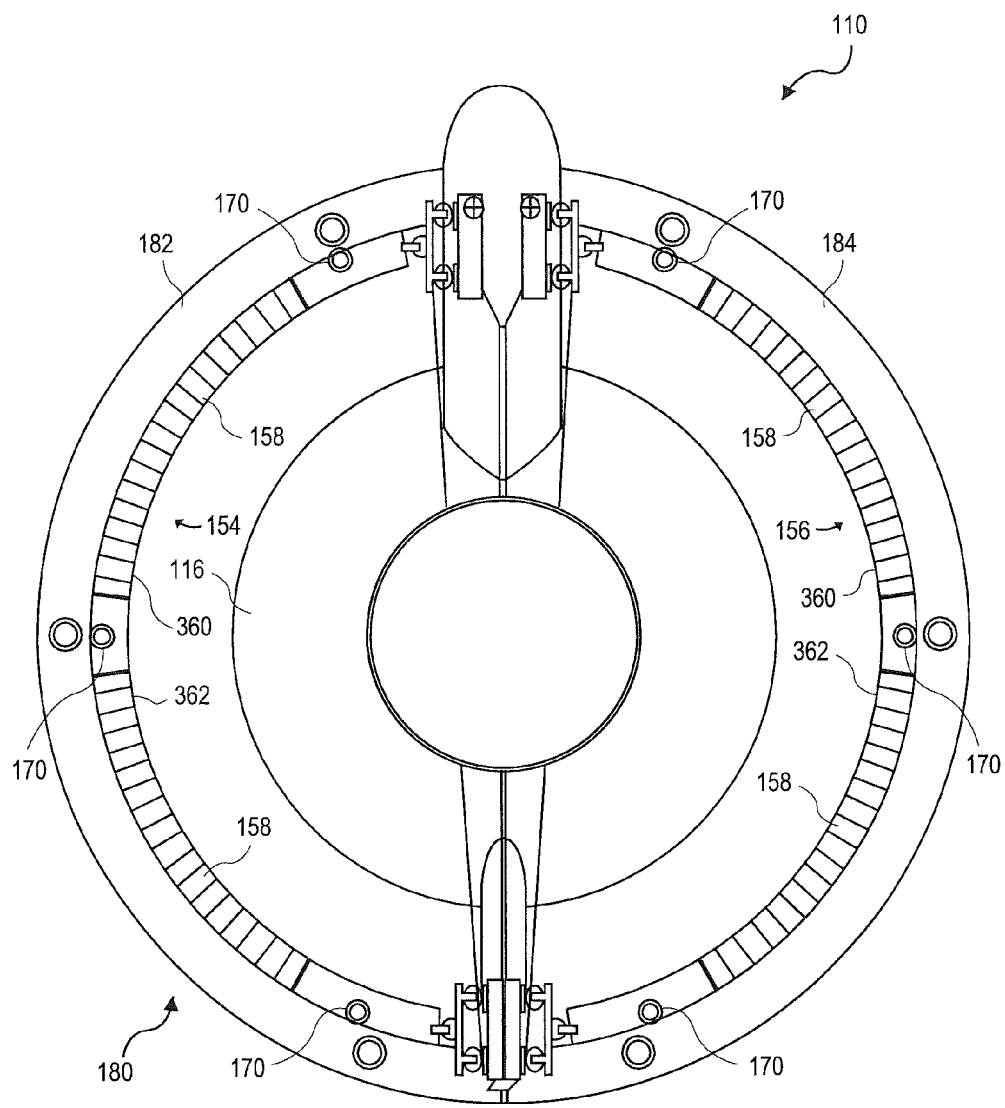
FIG. 3 illustrates a radial cross-section view of an aircraft engine in accordance with an embodiment.

FIG. 3 illustrates a radial cross-section view of an aircraft engine in accordance with an embodiment. FIG. 3 shows the aft end of the aircraft engine 110 with the thrust reverser 180, having the thrust reverser sleeves 182 and 184, shown along the outside. The VAFN assembly 150, with the VAFN sections 154 and 156, is shown located farther inward, toward the engine core 116.

The VAFN sections 154 and 156 are moved axially by the VAFN actuators 170, of which six are shown in the exemplary embodiment of FIG. 3. Other numbers of actuators can be used, and non-actuated guide tubes can stabilize the translatable thrust reverser sleeves and/or VAFN airfoils against undesirable translations and/or vibrations. In some embodiments, the actuators are not symmetrically spaced as shown in the figure.

In the illustrated embodiment, the cascade vane openings 158 are located in the VAFN sections and are implemented as at least two rows, or sets of openings. FIG. 3, for example, shows the cascade vane openings as two sets or groupings of openings located within the VAFN section 154, one upper set of openings 360 provided in the left VAFN section 154 and one lower set of openings 362 provided in the right VAFN section 156. That is, each VAFN section 154, 156 has an upper set of vanes 360 and a lower set of vanes 362, such that the actuator 170 is located between each respective upper and lower set of vanes. The upper and lower vanes 360 and 362 define their respective cascade vane openings 158. It should be noted that, in an alternative construction, the rows of cascade vane openings 158 may extend in a substantially circumferentially continuous fashion on each of the sections 154 and 156, on their respective left and right sides of the nacelle.

In the exemplary embodiment of FIG. 3, the upper vanes 360 can be canted differently from the lower vanes 362, so that the upper vanes direct air differently than the lower vanes. More particularly, the upper vanes 360 can be directed to deflect air more in a radial direction than an aft direction, as compared with the lower vanes 362. Meanwhile, the lower vanes 362 can be directed to deflect air more in a longitudinal, aft direction than a radial direction, as compared with the upper vanes 360.

Figure 4:
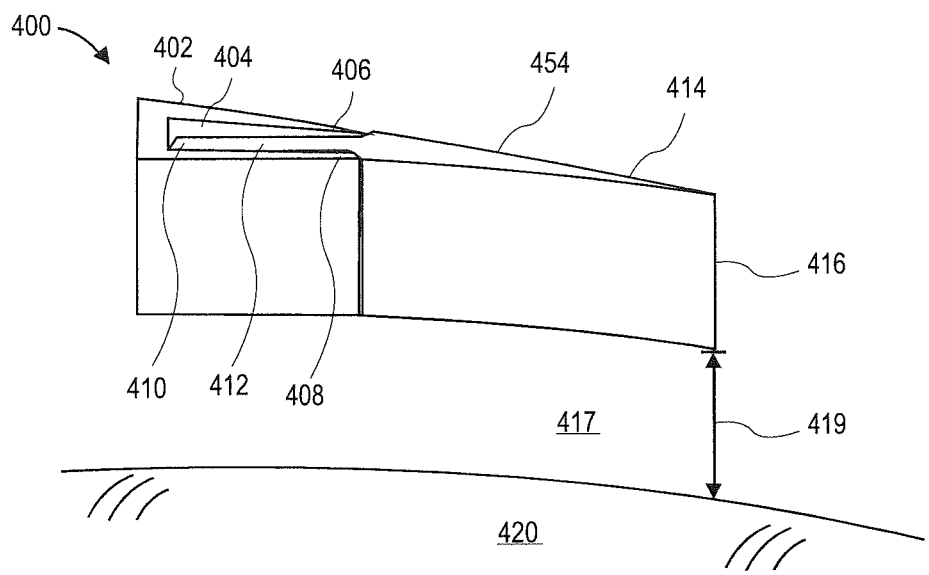
FIG. 4 illustrates a longitudinal cross-section view of a VAFN fully forward in accordance with an embodiment.

FIG. 4 illustrates a longitudinal cross-section view of a VAFN assembly 154 in a fully forward position in accordance with an embodiment. FIG. 4 shows a nacelle assembly apparatus 400 with a nacelle wall 402 having a thickness and an arcuate VAFN section 454. A small portion of the nacelle wall and arcuate ring VAFN section are shown in the figure for clarity. Those skilled in the art will appreciate that their full size can be akin to the thrust reverser sleeve 182 and the VAFN assembly section 154 in FIG. 1, respectively. VAFN assembly section 156 would be constructed in a similar fashion.

The nacelle wall 402 includes an aft end recess 404 within a thickness of the nacelle wall 402. The aft end recess 404 comprises a slot that extends circumferentially around the end of the circular nacelle wall 402. The upper, outer portion of the nacelle wall 402 has a relatively sharp trailing edge that allows outside air to flow cleanly and with little or no turbulence to the VAFN section 454. The lower, inner portion of the nacelle wall 402 also has a relatively sharp trailing edge that allows bypass air to flow cleanly, and with little or no turbulence, to the VAFN section 454.

The recess 404 of the nacelle wall 402 has an upper, inner lip 406. The upper, inner lip can comprise a seal that cooperates with the VAFN section 454. The recess 404 has a lower, inner lip 408, and the lower, inner lip can comprise another seal that cooperates with the VAFN section. Both seals can be constructed of rubber, synthetic elastomers, or other materials suitable for receiving a portion of the VAFN section and substantially preventing the entry of ice, debris, and airflow into the recess.

The VAFN section 454 includes a front region 410, a center region 412, a rear region 414, and a trailing edge 416.

The front region 410 of the VAFN section 454 bears up against and is at least partially supported within the recess 404 by the upper and lower seals 406, 408. For example, at least one of the upper and lower lip seals engages the front region 410 and is elastically deformed by it, if only slightly, around a substantial portion of the arcuate VAFN section 454 around its periphery or circumference. The upper and lower seal help not only in keeping out ice, debris, and airflow from the slot 404 but also to dampen vibrations or otherwise make the VAFN section more rigidly connected with the nacelle assembly. In some embodiments, metal-to-metal contact is made, and therefore there is no elastomeric seal. The lips may engage the VAFN front section and prevent it from wobbling or vibrating during flight.

In the fully forward position as shown in FIG. 4, the center region 412 is fully enclosed within the recess 404. No holes are exposed, and airflow flows out the bypass duct 417 through the rear between the VAFN trailing edge 416 and the inner fixed structure 420. A radial distance 419 between the VAFN trailing edge 416 and the inner fixed structure 420 defines an annular exit area of the bypass air from the engine.

Figure 5:
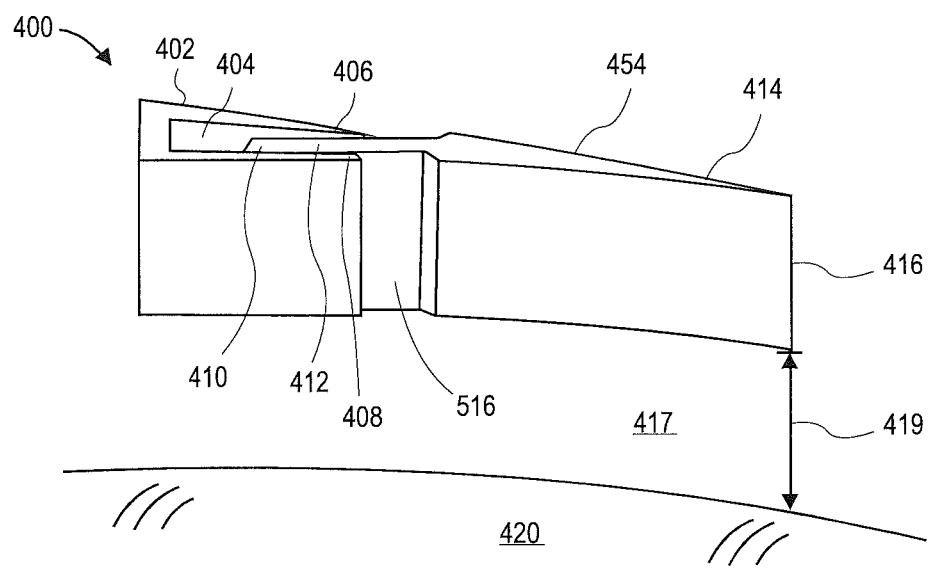
FIG. 5 illustrates a longitudinal cross-section view of the VAFN of FIG. 4 slightly open.

FIG. 5 illustrates a longitudinal cross-section view of the VAFN section 454 of FIG. 4 shown slightly open or in an aft position. The VAFN trailing edge 416 can translate axially aft to effectively any number of deployed positions, varying the distance 419 between the VAFN trailing 416 and the curving inner fixed structure 420. Varying the translation distance varies the annular exit area of the bypass air from the rear of the engine.

In the slightly-open position shown in FIG. 5, a surface 516 of the VAFN section 454 is exposed. FIG. 5 shows there are no holes in the surface 516, and thus the bypass air only exits through the rear of the engine between the VAFN trailing edge 416 and the inner fixed structure 420.

Figure 6:
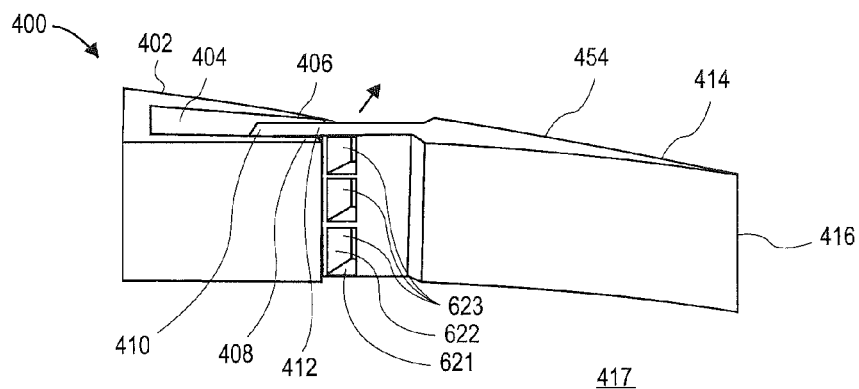
FIG. 6 illustrates a longitudinal cross-section view of the VAFN of FIG. 4 with one row of openings exposed.

FIG. 6 illustrates a longitudinal cross-section view of the VAFN section 454 of FIG. 4 with one row of openings exposed. The VAFN section 454 is translated further aft from that shown in FIG. 5, and an aperture 621 in the center region 412 of the VAFN section is exposed by moving past the seals 406 and 408 of the recess 404 to the outside. The aperture 621 includes a series of vanes 622 within it. The vanes 622 define a first row of holes 623 extending through the radially-extending thickness of the VAFN center region 412. That is, the holes 623 extend from a bypass duct-side of the VAFN center region 412 to the outside-of-the-engine side of the VAFN center region 412.

The vanes 622 direct some of the air from the bypass duct 417 radially and aft, as indicated in the direction of the arrow in FIG. 6. This illustrated construction provides a method of rapidly adjusting the area through which air can exit the engine. This construction can also allow a VAFN assembly to be designed so that it does not need to translate forward and aft as far as prior art designs to achieve its desired effects, because small translations in accordance with embodiments of the invention can produce the desired bypass flow exit-area changes.

Note that the illustration shows that the front region 410 of the VAFN section 454 is still supported within the recess 404 by the seals 406 and 408.

Figure 7:
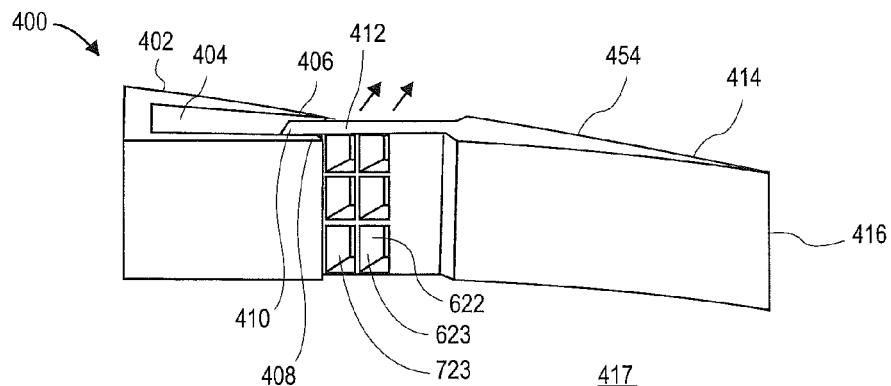
FIG. 7 illustrates a longitudinal cross-section view of the VAFN of FIG. 4 with two rows of openings exposed.

FIG. 7 illustrates a longitudinal cross-section view of the VAFN section 454 of FIG. 4 with two rows of openings exposed. The vanes 622 further define a second row of holes 723 that are exposed, next to the first row 623. The second row of holes have been moved axially out from behind the seals 406 and 408 further from that shown in FIG. 6. Thus, FIG. 7 shows two rows of the holes 623 and 723 that are exposed, and the vanes 622 of both the rows deflect the airflow in the radial and aft directions.

Note that the front region 410 is still supported within the recess 404 by the seals 406 and 408.

Figure 8:
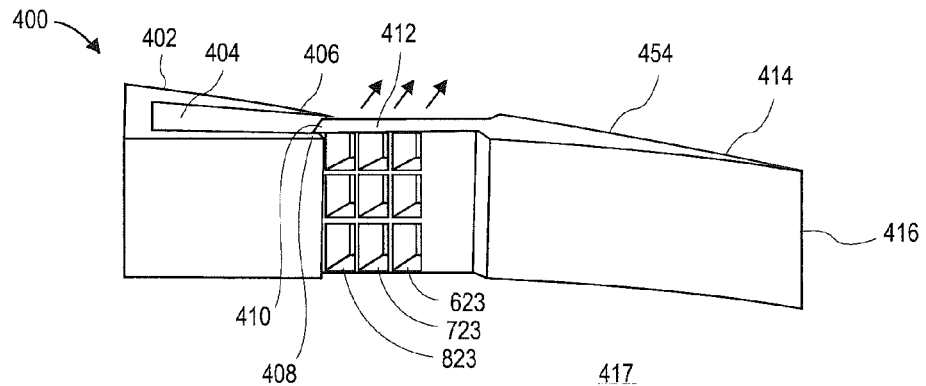
FIG. 8 illustrates a longitudinal cross-section view of the VAFN of FIG. 4 fully aft with three rows of openings exposed.

FIG. 8 illustrates a longitudinal cross-section view of the VAFN section 454 of FIG. 4 in a fully aft position with three rows of openings exposed. The vanes 622 further define a third row of holes 823 that are exposed. The third row of holes have moved further in the axially aft direction as compared to the position shown in FIG. 7. The three rows of the holes 623, 723, and 823 are shown exposed in FIG. 8, and the vanes 622 of all three of the rows deflect the airflow radially and aft.

Note the front region 410 is still supported within the recess 404 by the seals 406 and 408 even at this extreme aft position of the VAFN assembly. This design makes for a more rigid nacelle assembly 400 than if it were not continuously supported at the front region.

In the FIG. 8 embodiment, the axial lengths of each row are equal to each other. In other embodiments, the lengths of each row can be different from each other. For example, the first row of holes can have a first axial length L1, the second row of holes can have a second axial length L2, and the third row of holes can have a third axial length L3, wherein L3 >L2 >L1.

The VAFN section 454 can be retracted (in the reverse order shown from viewing FIGS. 4-8 in sequence) or can be moved back and forth as desired. It can be desirable to stop movement of the VAFN assembly 154 between the exposure of each full, integer row of holes by a mechanical detent in the actuators, electronic stops, or other predetermined settings. The settings can be associated with different operational regimes, such as different pressures or altitudes of flight. The length of each row can be tailored to the expected regime of flight.

Figure 9:
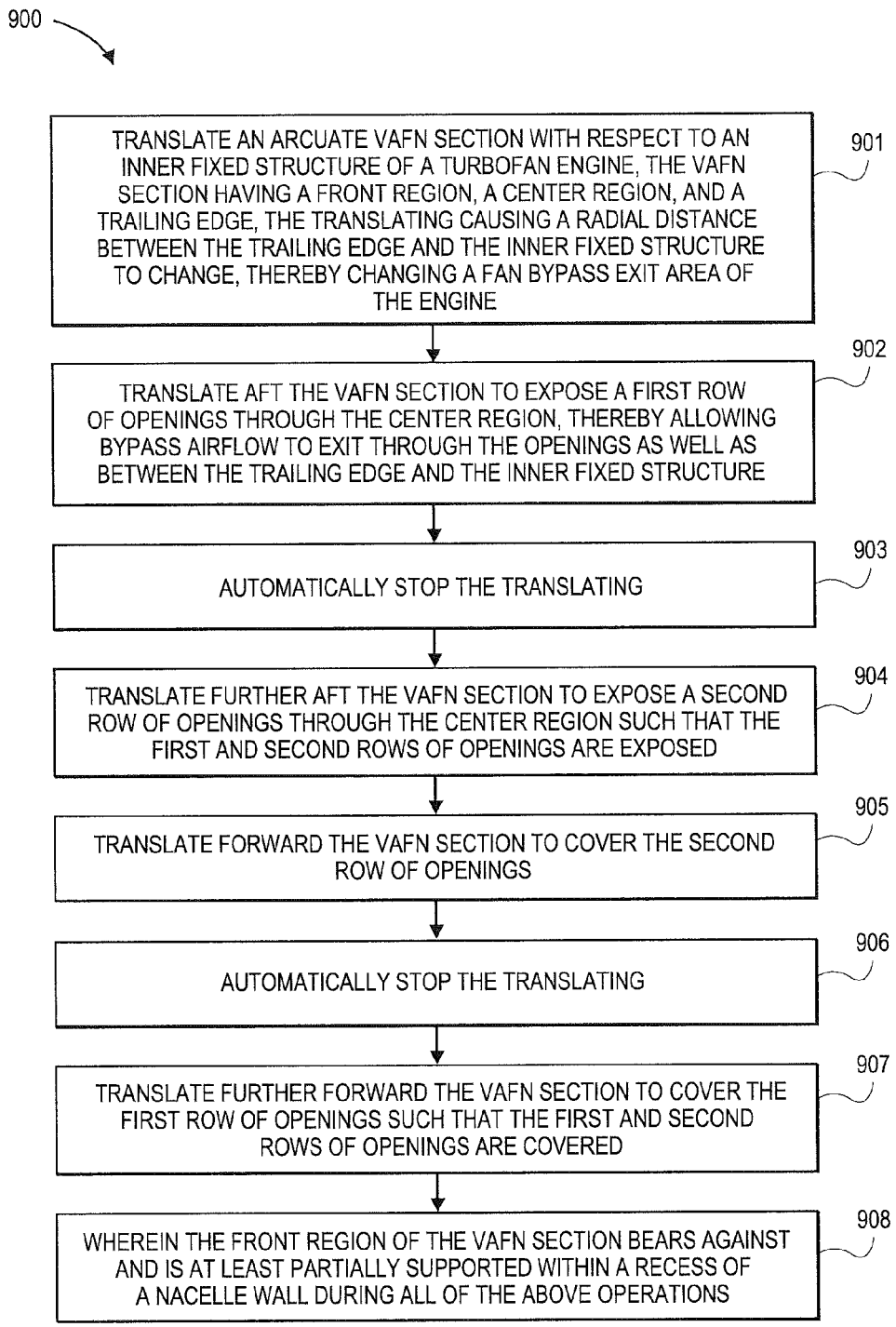
FIG. 9 is a flow chart of a process in accordance with an embodiment.

FIG. 9 is a flow chart of a process for adjusting VAFN assembly operation in accordance with an embodiment. The operations of the process 900 can be performed in different order as applicable. In the first operation 901, an arcuate VAFN section is translated with respect to an inner fixed structure of a turbofan engine, the VAFN section having a front region, a center region, and a trailing edge, the translating causing a radial distance between the trailing edge and the inner fixed structure to change, thereby changing a fan bypass exit area of the engine. In the second operation 902, the VAFN section is translated aft to expose at least a first row of openings through the center region, thereby allowing bypass airflow to exit through the openings as well as between the trailing edge and the inner fixed structure. In the third operation 903, the translating is automatically stopped. In this context, "automatic" stopping can include stopping by machine control without direct human intervention (e.g., by automatic operation of an electronic engine control), or as otherwise known in the art. In the next operation 904, the VAFN section is translated further aft to expose an additional row (or rows) of openings through the center region, such that at least the first and second rows of openings are exposed. In the fifth operation 905, the VAFN section is translated forward to cover the second row of openings. In the next operation 906, the translating is automatically stopped. In the next operation 907, the VAFN section is translated further forward to cover the first row of openings such that the first and second rows of openings are covered. The next operation 908, is understood to have a duration or application that covers all of the above operations. In particular, the operation of box 908 indicates the front region of the VAFN section bears against and is at least partially supported within the recess of a nacelle wall for all of the preceding FIG. 9 operations.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims. For example, the VAFN sections do not have to be translated in the aft and/or forward direction in increments of a single row of openings, or in increments of full integer(s) spacing of openings; instead, the translation extent can be determined by the operational needs of the aircraft.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A nacelle assembly apparatus for a turbofan engine, the apparatus comprising:
   a nacelle wall defining a bypass duct that extends at least partially around a centerline of a turbofan engine, the bypass duct being configured to transport bypass airflow of the engine, the nacelle wall having an aft end recess within a thickness of the nacelle wall; and
   an arcuate variable area fan nozzle (VAFN) section having a front region, a center region, and a trailing edge, the VAFN section being movable between (a) a fully forward position and (b) a fully aft position, the front region of the VAFN section configured to be at least partially supported within the recess of the nacelle wall at all positions between and including the fully forward and fully aft positions, and the center region configured within the recess of the nacelle wall where the VAFN section is in the fully forward position;
   wherein the VAFN section is configured to bear against and be at least partially supported by an internal lip of the recess, and the VAFN section is radially outboard of the internal lip.

2. The apparatus of claim 1, wherein the VAFN section is configured to bear against and be at least partially supported by a second internal lip of the recess, and the VAFN section is radially inboard of the second internal lip.

3. The apparatus of claim 1, wherein the internal lip of the recess comprises a seal.

4. The apparatus of claim 1, further comprising:
   an aperture through the center region of the VAFN section, the aperture covered by the nacelle wall recess when the VAFN section is in the fully forward position, the aperture exposed when then VAFN section is in the fully aft position,
   whereby when the VAFN section is in the fully aft position and the aperture is exposed, bypass airflow can exit the aperture.

5. The apparatus of claim 4, further comprising:
   at least one vane disposed within the aperture and dividing the aperture into rows of openings, the at least one vane configured to direct bypass airflow in an aft direction.

6. The apparatus of claim 5, wherein at least one of the rows of openings has an axial length different from an axial length of another of the rows of openings.

7. The apparatus of claim 4, further comprising a plurality of vanes disposed within the aperture, such that the plurality of vanes extend around at least a partial circumference of the engine.

8. The apparatus of claim 7, wherein a vane at a first circumferential position of the engine is configured to direct bypass airflow farther forward or aft than a vane at a second, different circumferential position of the engine.

9. The apparatus of claim 1, wherein when the VAFN section is in the fully forward position, the VAFN section forms a substantially continuous outer surface extending from an outer surface of the nacelle wall to an outer surface of the VAFN section.

10. The apparatus of claim 9, wherein when the VAFN section is in the fully forward position, the VAFN section forms a substantially continuous bypass duct-facing surface extending from a bypass duct-facing surface of the nacelle wall to a bypass duct-facing surface of the VAFN section.

11. The apparatus of claim 1, further comprising:
an inner fixed structure, the VAFN section configured to move with respect to the inner fixed structure to vary an exit area of the bypass duct.

12. A nacelle assembly apparatus for a turbofan engine, the apparatus comprising:
a nacelle wall defining a bypass duct that extends at least partially around a centerline of a turbofan engine, the bypass duct being configured to transport bypass airflow of the engine, the nacelle wall having an aft end recess within a thickness of the nacelle wall;
an arcuate variable area fan nozzle (VAFN) section having a front region, a center region, and a trailing edge, the VAFN section being movable between (a) a fully forward position and (b) a fully aft position, the front region of the VAFN section configured to stay within the recess of the nacelle wall at all positions between and including the fully forward and fully aft positions, the center region having a cascade of vanes defining multiple rows of openings, the vanes configured to direct bypass airflow in an aft direction; and
an actuator configured to move the VAFN section between predetermined settings between the fully forward and fully aft positions;
the aft end recess defined by an inner structure of the nacelle wall; and
at least a front portion of the VAFN section configured to radially engage at least a portion of the inner structure, which axially and circumferentially overlaps the front portion of the VAFN section, during VAFN section movement.

13. The apparatus of claim 12, wherein the predetermined settings are associated with take-off, cruise, and landing.

14. The apparatus of claim 12, wherein at least one of the rows of openings has an axial length different from an axial length of another of the rows of openings.

15. The apparatus of claim 12, wherein the predetermined settings are configured to halt movement of the VAFN section after each row of openings is exposed or covered.

16. A method of adjusting a fan bypass exit area of a turbofan engine with a variable area fan nozzle (VAFN), the method comprising:

translating an arcuate VAFN section with respect to an inner fixed structure of a turbofan engine, the VAFN section having a front region, a center region, and a trailing edge, the translating causing a radial distance between the trailing edge and the inner fixed structure to change, thereby changing a fan bypass exit area of the engine;
translating aft the VAFN section to expose a first row of openings through the center region, thereby allowing bypass airflow to exit through the openings as well as exit between the trailing edge and the inner fixed structure; and
translating forward the VAFN section to cover the first row of openings such that the first and second rows of openings are covered,
wherein the front region of the VAFN section is at least partially supported within a recess of a nacelle wall during each of the translatings to expose and cover the first row of openings;
wherein the recess is defined by an inner structure of the nacelle wall; and
wherein at least a front portion of the VAFN section radially engages at least a portion of the inner structure, which axially and circumferentially overlaps the front portion of the VAFN section, during the translatings of the VAFN section.

17. The method of claim 16, further comprising:
translating further aft the VAFN section to expose a second row of openings through the center region such that the first and second rows of openings are exposed, the front region at least partially supported within the recess of the nacelle wall; and
translating forward the VAFN section to cover the second row of openings,
wherein the front region of the VAFN section is at least partially supported within the recess of a nacelle wall during the translating movements to expose and cover the second row of openings.

18. The method of claim 17, further comprising:
automatically stopping the translating between exposing the first row and exposing the second row.

19. The method of claim 17, further comprising:
automatically stopping the translating between covering the first row and covering the second row.

20. The method of claim 16, wherein the translating movements are performed during flight of the engine.

* * * * *